US008014750B2

(12) United States Patent  
Agarwal et al.

(10) Patent No.: US 8,014,750 B2
(45) Date of Patent: Sep. 6, 2011

(54) REDUCING CALL SETUP DELAYS FROM NON-CALL RELATED SIGNALING

(75) Inventors: Kaitki Agarwal, Westford, MA (US); Rajat Ghai, Sandwich, MA (US); Jim Towey, Sandwich, MA (US)

(73) Assignee: Starent Networks LLC, Wilmington, DE (US)

( * ) Notice: Subject to any disclaimer, the term of this patent is extended or adjusted under 35 U.S.C. 154(b) by 919 days.

(21) Appl. No.: 11/953,001

(22) Filed: Dec. 7, 2007

(65) Prior Publication Data

US 2008/0139166 A1 Jun. 12, 2008

Related U.S. Application Data

(60) Provisional application No. 60/873,493, filed on Dec. 7, 2006.

(51) Int. Cl.
*H04M 11/04* (2006.01)

(52) U.S. Cl. ............... 455/404.1; 455/404.2; 455/435.3; 370/389; 370/229; 370/351

(58) Field of Classification Search .......... 370/386–393; 455/404.1–404.2, 428–435.3
See application file for complete search history.

(56) References Cited

U.S. PATENT DOCUMENTS

| | | | |
|---|---|---|---|
| 6,138,156 A | 10/2000 | Fletcher et al. | |
| 6,327,471 B1 | 12/2001 | Song | |
| 6,431,875 B1 | 8/2002 | Elliott et al. | |
| 6,477,590 B1 | 11/2002 | Habusha et al. | |
| 6,687,252 B1 | 2/2004 | Bertrand et al. | |
| 6,714,987 B1 | 3/2004 | Amin et al. | |
| 6,775,273 B1 | 8/2004 | Kung et al. | |
| 6,778,494 B1 | 8/2004 | Mauger | |
| 6,810,259 B1 | 10/2004 | Zhang | |
| 6,847,991 B1 | 1/2005 | Kurapati | |
| 6,853,630 B1 | 2/2005 | Manning | |
| 6,854,014 B1 | 2/2005 | Amin et al. | |
| 6,888,821 B2 | 5/2005 | Rasanen et al. | |
| 6,973,309 B1 | 12/2005 | Rygula et al. | |
| 6,978,380 B1 | 12/2005 | Husain et al. | |
| 7,454,206 B1 | 11/2008 | Phillips et al. | |

(Continued)

FOREIGN PATENT DOCUMENTS

EP 1414212 4/2004

(Continued)

OTHER PUBLICATIONS

International Search Report and Written Opinion for PCT Application No. PCT/US07/86886 mailed Apr. 10, 2008 (4 pages).

(Continued)

*Primary Examiner* — Dai A Phuong
(74) *Attorney, Agent, or Firm* — Wilmer Cutler Pickering Hale and Dorr LLP (57) ABSTRACT

Methods and apparatus are provided for reducing call setup delays resulting from non-call related signaling. In session initiation protocol (SIP) messaging, SIP session setup messaging can have the same priority for placement on the airlink to a mobile phone as other non-call session setup messaging. Method and apparatus for providing priority to call session setup messaging are providing, and in some cases, emergency call setup messaging. By providing priority to call setup messaging, delays that might result from being stuck in a queue behind non-call setup messaging can be reduced.

15 Claims, 6 Drawing Sheets

U.S. PATENT DOCUMENTS

| | | | |
|---|---|---|---|
| 7,613,836 | B2 | 11/2009 | Tober et al. |
| 2002/0029260 | A1 | 3/2002 | Dobbins et al. |
| 2002/0131404 | A1 | 9/2002 | Mehta et al. |
| 2003/0016630 | A1 | 1/2003 | Vega-Garcia et al. |
| 2003/0050076 | A1 | 3/2003 | Watanabe |
| 2003/0058872 | A1 | 3/2003 | Berggreen et al. |
| 2003/0188012 | A1 | 10/2003 | Ford |
| 2003/0227880 | A1 | 12/2003 | Heller et al. |
| 2004/0006573 | A1 | 1/2004 | Takashi |
| 2004/0047290 | A1 | 3/2004 | Komandur et al. |
| 2004/0054929 | A1 | 3/2004 | Serpa |
| 2004/0068574 | A1 | 4/2004 | Costa Requena et al. |
| 2004/0109414 | A1 | 6/2004 | Choi et al. |
| 2004/0109459 | A1 | 6/2004 | Madour et al. |
| 2004/0111476 | A1 | 6/2004 | Trossen et al. |
| 2004/0122954 | A1 | 6/2004 | Shaheen |
| 2004/0122967 | A1 | 6/2004 | Bressler et al. |
| 2004/0137918 | A1 | 7/2004 | Varonen et al. |
| 2004/0139230 | A1 | 7/2004 | Kim |
| 2004/0224688 | A1* | 11/2004 | Fischer ............... 455/435.1 |
| 2005/0002381 | A1 | 1/2005 | Westman et al. |
| 2005/0005025 | A1 | 1/2005 | Harville et al. |
| 2005/0009520 | A1 | 1/2005 | Herrero et al. |
| 2005/0021713 | A1 | 1/2005 | Dugan et al. |
| 2005/0083974 | A1 | 4/2005 | Mayer et al. |
| 2005/0111450 | A1 | 5/2005 | Miyamoto et al. |
| 2005/0124341 | A1 | 6/2005 | Myllymaki et al. |
| 2005/0190740 | A1 | 9/2005 | Zhao et al. |
| 2005/0201357 | A1 | 9/2005 | Poyhonen |
| 2005/0204052 | A1 | 9/2005 | Wang et al. |
| 2005/0233727 | A1* | 10/2005 | Poikselka et al. ......... 455/404.2 |
| 2006/0031559 | A1 | 2/2006 | Sorokopud et al. |
| 2006/0046714 | A1 | 3/2006 | Kalavade |
| 2006/0058056 | A1 | 3/2006 | Das et al. |
| 2006/0067244 | A1 | 3/2006 | Sekaran et al. |
| 2006/0104431 | A1 | 5/2006 | Emery et al. |
| 2006/0146792 | A1 | 7/2006 | Ramachandran et al. |
| 2006/0155871 | A1 | 7/2006 | Ilkka et al. |
| 2006/0193295 | A1 | 8/2006 | White et al. |
| 2006/0211423 | A1 | 9/2006 | Ejzak et al. |
| 2006/0239255 | A1 | 10/2006 | Ramachandran et al. |
| 2006/0251050 | A1 | 11/2006 | Karlsson |
| 2006/0256751 | A1 | 11/2006 | Jagadeesan et al. |
| 2006/0256779 | A1 | 11/2006 | Lim et al. |
| 2006/0264213 | A1 | 11/2006 | Thompson |
| 2006/0270404 | A1 | 11/2006 | Tuohino et al. |
| 2007/0022199 | A1 | 1/2007 | Tatsubori |
| 2007/0025301 | A1 | 2/2007 | Petersson et al. |
| 2007/0036078 | A1 | 2/2007 | Chowdhury et al. |
| 2007/0036079 | A1 | 2/2007 | Chowdury et al. |
| 2007/0041320 | A1 | 2/2007 | Chen et al. |
| 2007/0058561 | A1 | 3/2007 | Virgile |
| 2007/0066286 | A1 | 3/2007 | Hurtta |
| 2007/0076729 | A1 | 4/2007 | Takeda |
| 2007/0082681 | A1 | 4/2007 | Kim et al. |
| 2007/0097967 | A1* | 5/2007 | Kauppinen et al. ........... 370/389 |
| 2007/0156869 | A1 | 7/2007 | Galchev et al. |
| 2007/0206515 | A1 | 9/2007 | Andreasen et al. |
| 2007/0206617 | A1 | 9/2007 | Andreasen et al. |
| 2007/0209061 | A1 | 9/2007 | Dekeyzer et al. |
| 2007/0253371 | A1 | 11/2007 | Harper et al. |
| 2007/0254673 | A1 | 11/2007 | Stenberg et al. |
| 2008/0002592 | A1 | 1/2008 | Yegani et al. |
| 2008/0020775 | A1 | 1/2008 | Willars |
| 2008/0052387 | A1 | 2/2008 | Heinz et al. |
| 2008/0084867 | A1 | 4/2008 | Foti et al. |
| 2008/0095339 | A1 | 4/2008 | Elliott et al. |
| 2008/0130637 | A1 | 6/2008 | Kant et al. |
| 2008/0137541 | A1 | 6/2008 | Agarwal et al. |
| 2008/0219218 | A1 | 9/2008 | Rydnell et al. |
| 2008/0233947 | A1 | 9/2008 | Herrero-Veron |
| 2008/0254768 | A1 | 10/2008 | Faccin |
| 2009/0054037 | A1 | 2/2009 | Kaippallimalil |
| 2009/0109845 | A1 | 4/2009 | Andreasen et al. |
| 2009/0285225 | A1 | 11/2009 | Dahod |

FOREIGN PATENT DOCUMENTS

| | | |
|---|---|---|
| EP | 2092766 | 8/2009 |
| WO | WO-01/22642 | 3/2001 |
| WO | WO-2007/081727 | 7/2007 |
| WO | WO-2008/070869 | 6/2008 |
| WO | WO-2009/067445 | 5/2009 |

OTHER PUBLICATIONS

International Search Report and Written Opinion for PCT Application No. PCT/US07/86808 issued on Apr. 10, 2008 (4 pages).

International Search Report and Written Opinion issued for International Patent Application No. PCT/US2007/086747 issued on May 7, 2008 (6 pages).

International Search Report and Written Opinion issued for International Patent Application No. PCT/US2007/086802 issued on May 20, 2008 (6 pages).

International Search Report for corresponding International Patent Application No. PCT/US2007/086884 issued on Apr. 10, 2008 (4 pages).

<http://www.acmepacket.com/html/page.asp?PageID=%7bFB2657BA-EE7A-46C1-BEA8-F650C93BF5C3%7d> printed on Dec. 5, 2009 (19 pages).

<http://www.3gpp.org/ftp/Specs/html-info/24229.htm> printed on Dec. 5, 2009 (4 pages).

CT Labs Report, "SIP and RTP Denial of Service Attack Tests Summary Report", pp. 1-4, 2005.

http://www.3gpp.org, 3GPP TS 24.229 V6.12.0 (Sep. 2006), Oct. 3, 2006 (2 pages).

International Search Report and Written Opinion for PCT Application No. PCT/US2007/000132 mailed on Oct. 2, 2007 (12 pages).

International Search Report and Written Opinion for PCT Application No. PCT/US2008/83911 issued on Jan. 12, 2009 (5 pages).

International Search Report and Written Opinion for corresponding International Patent Application No. PCT/US2009/043696 issued on Jun. 24, 2009 (5 pages).

3GPP TS 23.401 v8.3.0 (Sep. 2008), 3rd Generation Partnership Project; Technical Specification Group Services and System Aspects; General Packet Radio Services (GPRS) enhancements for Evolved Univeral Terrestrial Radio Access Network (E-UTRAN) access (Release 8), http://www.3gpp.org (39 pages).

3GPP TS 29.274 v1.3.0 (Oct. 2008), 3rd Generation Partnership Project; Technical Specification Group Core Network and Terminals; 3GPP Evolved Packet System; Evolved GPRS Tunnelling Protocol for Control Plane (GTPv2-C0; Stage 3 (Release 8); http://www.3gpp.org (1 page).

3GPP TS 36.413 v8.3.0 (Sep. 2008), 3rd Generation Partnership Project; Technical Specification Group Radio Access Network; Evolved Univeral Terrestrial Radio Access Network (E-UTRAN0; S1 Application Protocol (S1AP) (Release 8), http://www.3gpp.org (2 pages).

Nguyen-Vuong. "Mobility Management in $G Wireless Heterogeneous Networks", PhD thesis. Jul. 2, 2008. www.biblio.univ.evry.fr/theses/2008/2008EVRY00007.pdf (225 pages).

International Search Report for International Application No. PCT/US09/64823 mailed Feb. 12, 2010 (1 page).

* cited by examiner

REDUCING CALL SETUP DELAYS FROM NON-CALL RELATED SIGNALING

CROSS REFERENCE TO RELATED APPLICATION

This application claims benefit under 35 U.S.C. §119(e) of U.S. Provisional Patent Application No. 60/873,493, entitled "Apparatus and Method for Providing a Call Session Control Function," filed Dec. 7, 2006, which is hereby incorporated by reference herein in its entirety.

FIELD OF THE DISCLOSURE

This disclosure relates to a system and method for providing reduced call setup delays that result from non-call related signaling in communication networks.

BACKGROUND

Wireless communication systems and networks are used in connection with many applications, including, for example, satellite communications systems, portable digital assistants (PDAs), laptop computers, and cellular telephones. One significant benefit that users of such applications obtain is the ability to connect to a network (e.g., the Internet) as long as the user is within range of such a wireless communication system.

Current wireless communication systems use either, or a combination of, circuit switching and packet switching in order to provide mobile data services to a mobile node. A mobile node can be a cell phone, a PDA, a Blackberry, a laptop computer with a wireless card, or any other wireless device. Generally speaking, with circuit-based approaches, wireless data is carried by a dedicated (and uninterrupted) connection between the sender and recipient of data using a physical switching path. Once the direct connection is set-up, it is maintained for as long as the sender and receiver have data to exchange. The establishment of such a direct and dedicated switching path results in a fixed share of network resources being tied up until the connection is closed. When the physical connection between the sender and the receiver is no longer desired, it is torn-down and the network resources are allocated to other users as necessary.

Packet-based approaches, on the other hand, do not permanently assign transmission resources to a given call, and do not require the set-up and tear-down of physical connections between a sender and receiver of data. In general, a data flow in packet-based approaches is "packetized," where the data is divided into separate segments of information, and each segment receives "header" information that may provide, for example, source information, destination information, information regarding the number of bits in the packet, priority information, and security information. The packets are then routed to a destination independently based on the header information. The data flow may include a number of packets or a single packet.

Packet-based communications with mobile nodes is evolving to be increasingly multimedia rich, and a part of this process has been the development of IP Multimedia Subsystem (IMS). IMS is an architectural framework for delivering internet protocol (IP) multimedia to mobile nodes. A call session control function (CSCF) can manage much of the signaling that occurs in an IMS core. The CSCF functionality can be logically divided into three functionalities: a Proxy-CSCF (P-CSCF), an Interrogating CSCF (I-CSCF), and a Serving CSCF (S-CSCF). Additionally, the CSCF functionality is envisioned by two different groups for inclusion in two different topologies: Global System for Mobile Communications (GSM) and CDMA 2000. The $3^{rd}$ Generation Partnership Project (3GPP) is responsible for IMS which works with GSM systems and the $3^{rd}$ Generation Partnership Project 2 (3GPP2) is responsible for Multimedia Domain (MMD) which is used with CDMA systems and is based on the 3GPP IMS concept.

SUMMARY OF THE DISCLOSURE

Systems and methods for providing reduced delay call session setup are disclosed. In certain embodiments, a chassis that facilitates network connectivity comprising a proxy-call session control function (P-CSCF) residing on the chassis that receives a session initiation protocol (SIP) call setup request message, the P-CSCF sending a SIP Invite message to setup an emergency call with a public service answering point (PSAP), a queue residing in the P-CSCF with at least one message waiting for airlink availability, and the P-CSCF receiving a call setup message and placing this call setup message on the airlink before the at least one message waiting in the queue are provided.

In some embodiments, a call session setup method comprising receiving a session initiation protocol (SIP) call session setup request message at a proxy-call session control function (P-CSCF), sending a SIP Invite message from the P-CSCF to complete the call session request, receiving a call session setup message in response to the call session setup request message at the P-CSCF and checking the call session setup message, determining whether the call session setup message receives priority over other SIP messages residing in a queue for airlink availability, and placing the call session setup message on the airlink prior to the other SIP messages residing in the queue are provided.

DETAILED DESCRIPTION

Systems and methods are provided for reducing the impact of non-call related signaling on call session setup in accordance with some embodiments. In IP multimedia subsystems (IMS) and multimedia domain (MMD) networks, session initiation protocol (SIP) can be used for transferring presence updates (for certain applications) and short text messages, among other things. This creates bursts of non-multimedia session related signaling interleaved with multimedia session-related signaling. A problem arises when both call setup signaling and non-call related signaling, such as presence updates, have the same priority or there is no mechanism to prioritize the signaling. This can result in increased SIP session set-up times or call setup failure during a system or network overload.

For example, if a user or multiple users have an instant messaging service running on their SIP mobile node, then the instant messaging program gets updates through publish or subscriber notify messages. These messages can be quite large depending on the size of a user's buddy list and other factors. There can also be a number of presence updates occurring with these phones depending on the number of SIP phones using an airlink. The presence updates can interfere with session setups because the session setup messaging is delayed waiting for airlink availability behind these other messages. This problem generally arises when many types of messaging share the same priority or there is no provision for prioritizing the signaling. The session setup messaging can become delayed in the queue behind either a number of messages fighting for airlink bandwidth or large messages that effectively block the airlink while being transmitted.

This head of line blocking can be noticeable to users using their SIP phones for voice calls (e.g., voice over IP (VoIP) calls) or while waiting for start of a session. One example where timing is important is in emergency calls. To make an emergency call, a user of mobile handset dials 911 and gets connected to a PSAP (public service answering point). The connection can be delayed because of congestion and a backup of the queue for access to the airlink. If for some reason calling party is disconnected (e.g., someone forces an end to the call) PSAP will callback the user immediately. If the downlink is congested (i.e., the queue includes a number of messages, such as presence updates), then this emergency callback is delayed. The delay may be exacerbated for emergency calls because the system is supposed to give priority to an emergency call over other calls, so an emergency call can still get placed where a normal call would likely be dropped due to the congestion.

Figure 1:
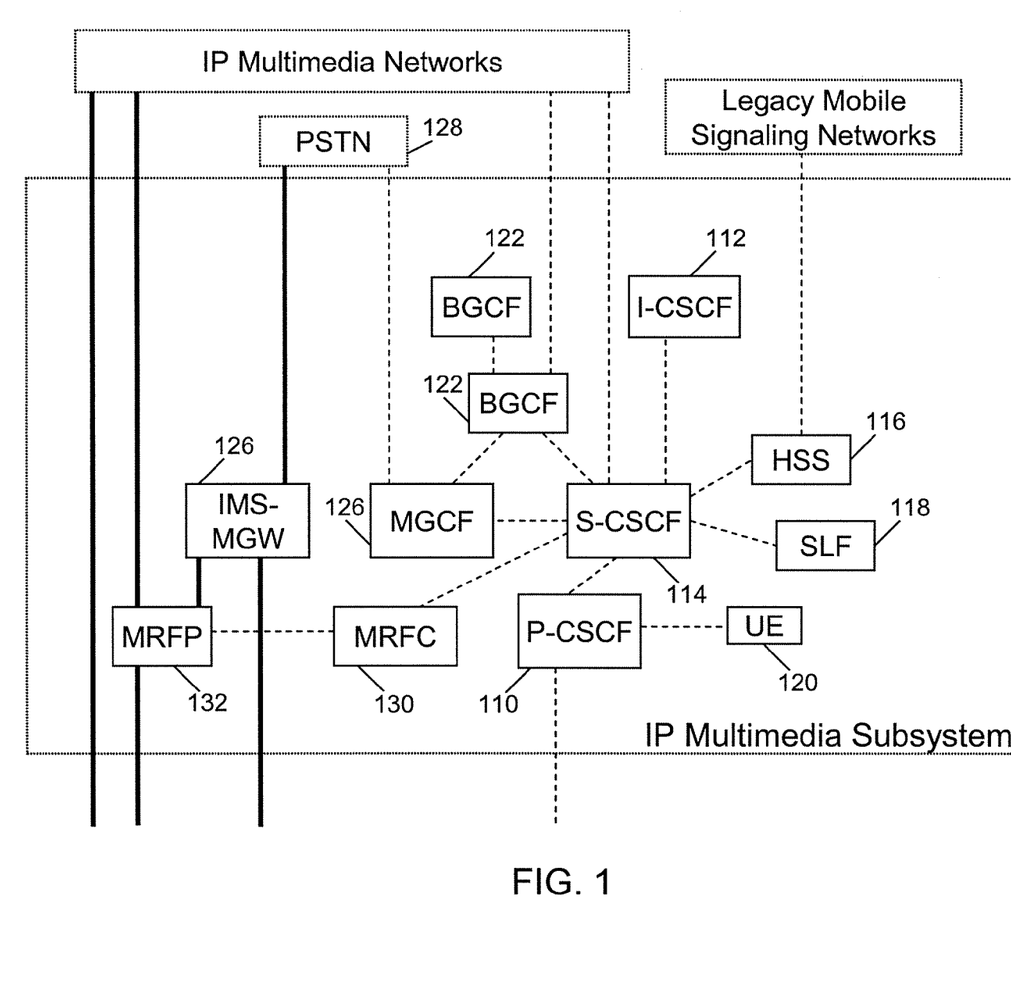
FIG. 1 is a functional block illustration of an IP Multimedia Subsystem (IMS) communication network.

FIG. 1 illustrates an IP multimedia subsystem (IMS) where logical components of a network setup are shown in accordance with some embodiments. FIG. 1 includes a P-CSCF 110, an I-CSCF 112, a S-CSCF 114, a Home Subscriber Server (HSS) 116, a Subscriber Location Function (SLF) 118, User Equipment (UE) 120, Breakout Gateway Control Function (BGCF) 122, Media Gateway Control Function (MGCF) 124, Media Gateway (MGW) 126, Public Switched Telephone Network (PSTN) 128, Multimedia Resource Controller (MRFC) 130, and Multimedia Resource Function Processor (MRFP) 132. HSS 116 is a master user database that supports the S-CSCF or other network entities that handle calls and sessions. HSS 116 stores subscription-related information such as user profiles, performs user authentication and authorization, and can provide information about the physical location of the user. When multiple HSSs are used in a network a SLF 118 can be used to direct the queries to HSS 116 storing the information. Legacy signaling networks may also use the HSS for services. MRFC 130 communicates with S-CSCF 114 and controls the MRFP 132 to implement media related functions. The combination of MRFC 130 and MRFP 132 provides a source of media in the home network. BGCF 122 is a server that can route based on telephone number and is used when calling to a phone on the circuit switched network. MGCF 124 and MGW 126 are used to convert signaling from IMS to that which is appropriate for PSTN 128 circuit switched networks. The IP Multimedia Networks can include application servers and other network entities that provide services to user equipment 120. The user equipment (or mobile node) can include a cell phone, a personal digital assistant (PDA), or a laptop computer.

Figure 2:
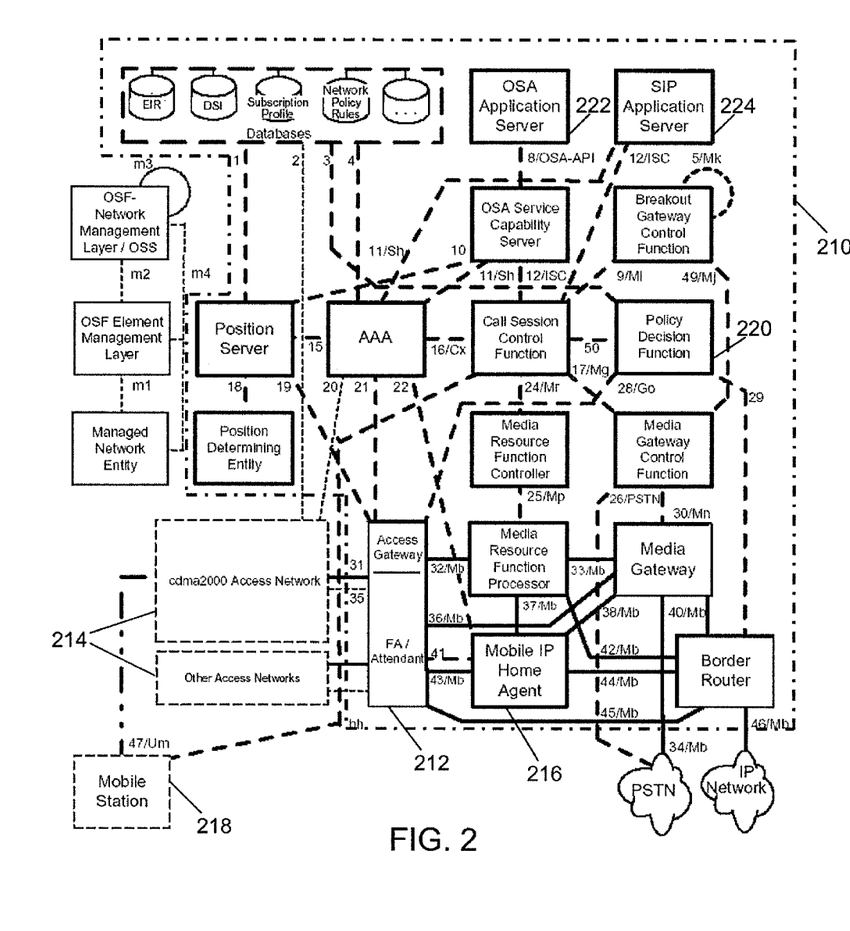
FIG. 2 is a functional block illustration of a Multimedia Domain (MMD) system.

FIG. 2 illustrates a Multimedia Domain (MMD) system 210 within a larger network. The MMD system 210 includes many of the same functions as the IMS system of FIG. 1, but further includes an access gateway/foreign agent 212 to communicate with access networks 214, as well as a home agent 216 to provide Mobile IP support to mobile stations 218 (or mobile node). A policy decision function (PDF), which can be included in a IMS or MMD network stores policies governing a user's session. Application servers such as an open systems architecture (OSA) application server 222 and SIP application server 224 provide applications such as location based services, video, email, chat, gaming, and other data and multimedia content.

Figure 3:
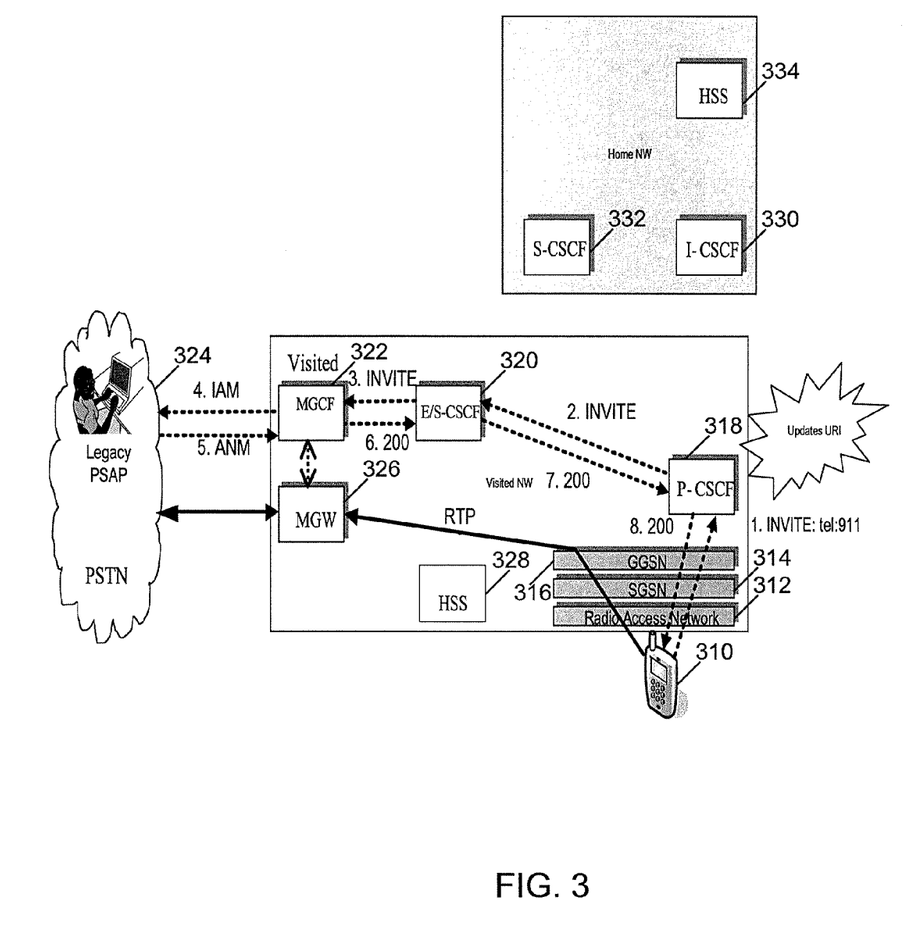
FIG. 3 is a functional block illustration of an emergency call on an IMS network in accordance with certain embodiments.

FIG. 3 illustrates an emergency call on an IMS network in accordance with certain embodiments. The logical functions and/or network devices in FIG. 3 include mobile node (MN) 310, radio access network 312, a serving GPRS support node (SGSN) 314, a gateway GPRS support node (GGSN) 316, a P-CSCF 318, an emergency/serving-call session control function (E/S-CSCF) 320, a media gateway control function (MGCF) 322, a legacy PSAP on a public switched telephone network (PSTN) 324, a multimedia gateway (MGW) 326, a home subscriber server (HSS) 328, a home network I-CSCF 330, a home network S-CSCF, and a home network HSS 334. In some embodiments, MN 310 can detect the emergency call. In other embodiments, P-CSCF 318 can detect the call is an emergency call by performing a translation of the request URI and inserting the emergency indication in the SIP INVITE before forwarding the message to E-CSCF 320. As shown, MN 310 sends an INVITE through the access network to P-CSCF 318, with the telephone number indicated as 911. P-CSCF 318 sends an invite message to E-CSCF 320, which can route the message to PSAP 324 for emergency operator assistance. The emergency call can proceed using real-time transport protocol (RTP) from MN 310 to MGW 326 and finally to PSAP 324. MN 310 may register with its home network, which would involve I-CSCF 330, S-CSCF 332, and HSS 334.

Figure 4:
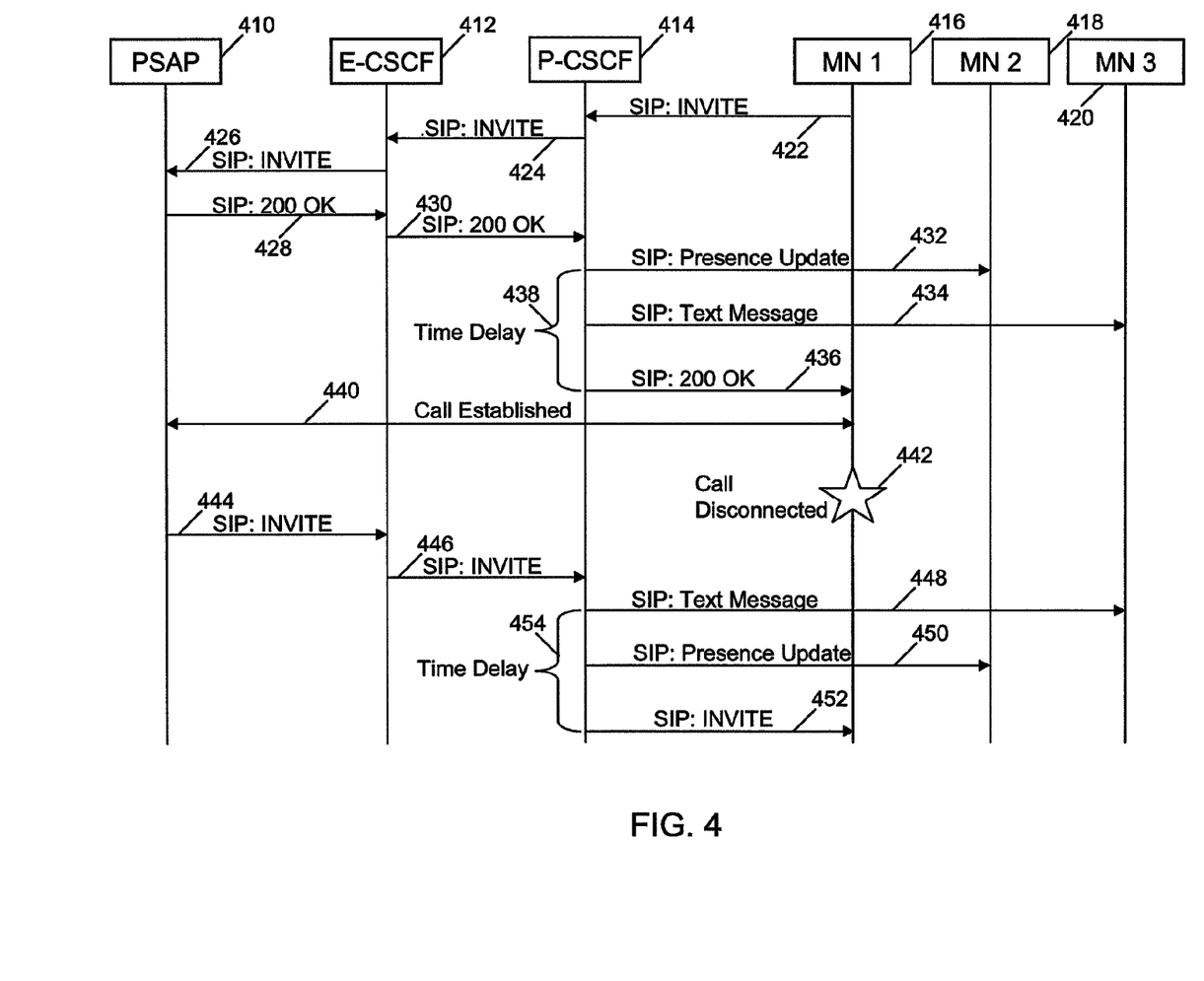
FIG. 4 is a signaling diagram of emergency call signaling in accordance with certain embodiments.

FIG. 4 illustrates emergency call signaling where the signaling is delayed due to other messaging in accordance with some embodiments. The logical functions and/or network devices in FIG. 3 include a PSAP 410, an E-CSCF 412, a P-CSCF 414, mobile node (MN) 1 416, mobile node (MN) 2 418, and mobile node (MN) 3 420. In initiating an emergency call using SIP enabled MN 1 416, a SIP: Invite message 422 is sent from MN 1 416 to P-CSCF 414. SIP: Invite message 422 may include an indication that the call is for an emergency call, otherwise P-CSCF 414 can detect that the call is for an emergency call. An emergency public user identity, location information from MN 1 416 and the P-CSCF 414 can handle emergency session and other requests from both a registered and an unregistered user. If MN 1 416 is equipped with an UMTS integrated circuit card (UICC), for example, MN 1 416 sends an IMS session establishment request to the P-CSCF containing an indication that this is for an emergency session establishment. If MN 1 416 is not equipped with a UICC or comparable device, then an anonymous emergency session response is sent. This response can be further authenticated by checking certain parameters such as the request URI matching as an emergency URI. P-CSCF 414, upon detecting the call is an emergency call, sends a SIP: Invite message 424 to E-CSCF 412. P-CSCF can translate the request URI to the URI of the E-CSCF before routing the SIP: Invite message 424. E-CSCF can send a SIP: Invite message 426 to PSAP 410.

As shown in FIG. 3, support for legacy PSAP systems is also provided. If a legacy system is involved, other network devices may be used to send the message over a PSTN and an ISUP:IAM may be sent from a gateway network device. If PSAP can handle the call, a SIP: 200 OK message 428 is sent back to E-CSCF 412. If no acknowledgement message is received at E-CSCF 412 after requesting a session, then another PSAP may be selected. E-CSCF sends a SIP: 200 OK message 430 to P-CSCF 414 to confirm the call setup. At P-CSCF 414, the outgoing message queue has other messages. A SIP: presence update message 432 is sent to MN 2 418 and a SIP: text message 434 is sent to MN 3 before the emergency call setup message. SIP: 200 OK message 436 is therefore delayed by a time 438 until the message moves to the front of the queue. A call is established between PSAP 410 and MN 1 416 in 440. In some embodiments, SIP: 200 OK message 436 is handled specially to avoid any setup delays by giving the 200 OK message 436 special priority.

In 442, the emergency call is disconnected. The PSAP initiates a call back if the call is disconnected, and so a SIP: Invite message 444 is sent to E-CSCF 412 to call MN 1 416 back. E-CSCF 412 sends a SIP: Invite 446 to P-CSCF 414. P-CSCF 414 can again be backed up with messages that need to go out prior to the emergency call invite message. A SIP: text message 448 and a SIP: Presence update 450 are sent before SIP: Invite message 452 as a result of the P-CSCF not treating the emergency call message differently. This incurs a time delay 454 in calling back MN 416 or can lead to a call rejection if the system is running low on resources, e.g., memory. This is avoided by various embodiments disclosed herein.

Figure 5:
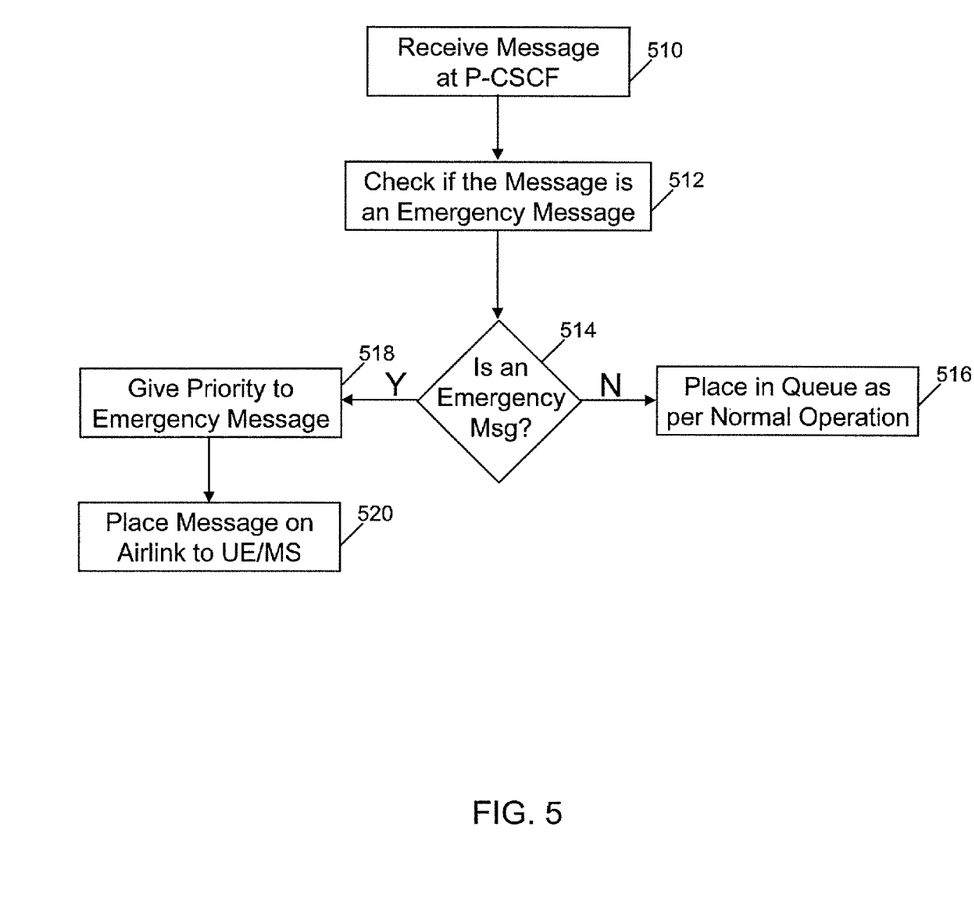
FIG. 5 is a flow diagram of handling an emergency message in accordance with certain embodiments.

FIG. 5 illustrates a flow diagram of how an emergency message is handled in certain embodiments. In step 510, a message (which may be SIP) is received at the P-CSCF. A check is performed on the message at step 512 to determine the message is an emergency message. This can be done through filtering or other associated methods, where messages whose headers include a certain flag, port number, type indicator, or IP address can be provided special treatment. In step 514, through filtering or other means a decision is made if the message is an emergency message 514. If the message is not an emergency message than the message is placed in the queue as it would be under normal operating conditions, in step 516. If the message is an emergency message, in step 518, the emergency message is given priority. The priority can be given by placing the messaging in a separate higher priority queue with pre-allocated memory, placing the message at the head of the line, giving the message special status (e.g., by tagging the message), or any other applicable method. In step 520, the message is placed on the airlink to the MN.

In some embodiments, a call session control function (CSCF) is modified to solve this problem by defining priority queues for non-call setup messages and call setup messages separately, and giving higher priority for call setup messages. This will avoid call setup delay for multimedia calls and emergency calls during signaling traffic bursts caused by non-call setup messages. In other embodiments, the priority of the messages can remain the same, but different ports are defined for the separate traffic flows. A first port is set aside for emergency and other call setup messages and a second port is for non-call setup messages. Messaging sent to the first port is then sent on the airlink before traffic sent to the second port. In certain embodiments, other devices besides a CSCF can be used to implement the invention. In some embodiments, software is utilized to implement the invention.

In the context of the IMS and MMD networks, a proxy-call session control function (P-CSCF) is the first point of contact when setting up a session on the network. The P-CSCF is typically located in the visited network, or in the home network when the visited network is not yet IMS compliant. The P-CSCF acts as a proxy and forwards messages from the mobile node (MN) to the appropriate network entity and vice versa. The P-CSCF can perform a number of functions such as inspect the messages, provide SIP message compression/decompression using, e.g., SIGComp, provide a security association to the mobile node, and generate charging data records (CDR). The P-CSCF can provide these functions and others, in part, because the P-CSCF sits on the path of the message signaling. The P-CSCF can also include or communicate with a policy decision function (PDF), such as PDF 220 of FIG. 2, that is authorizes media resources such as the quality of service (QoS) provided, management of bandwidth, and access provided.

The I-CSCF is the contact point within a network for connections destined to a user of that network or a roaming user currently located within the network's service area. The I-CSCF assigns a S-CSCF to a user so that the user can communicate with the network. The I-CSCF's IP address is published in the DNS of the domain typically so that remote servers can find it and use it as an entry point. The I-CSCF can also provide topology hiding of the network.

The S-CSCF performs the session control services for the MN or handset. This includes handling registrations of the MN, inspecting messages being routed through the S-CSCF, deciding the application server to provide service, providing routing services such as sending messages to the chosen application server or to a the PSTN, and enforcing the policies of the network for a given user. The S-CSCF communicates with the HSS to access user profiles and other information.

Application servers, e.g., application server 222 shown in FIG. 2, host and execute services such as caller ID, call waiting, call holding, push-to-talk, call forwarding, call transfer, call blocking services, lawful interception, announcement services, conference call services, voicemail, location based services, and presence information. The application servers can interface with the S-CSCF using SIP and depending on the service can operate in a SIP proxy mode, a SIP user agent mode, or a SIP back-to-back user agent mode.

Figure 6:
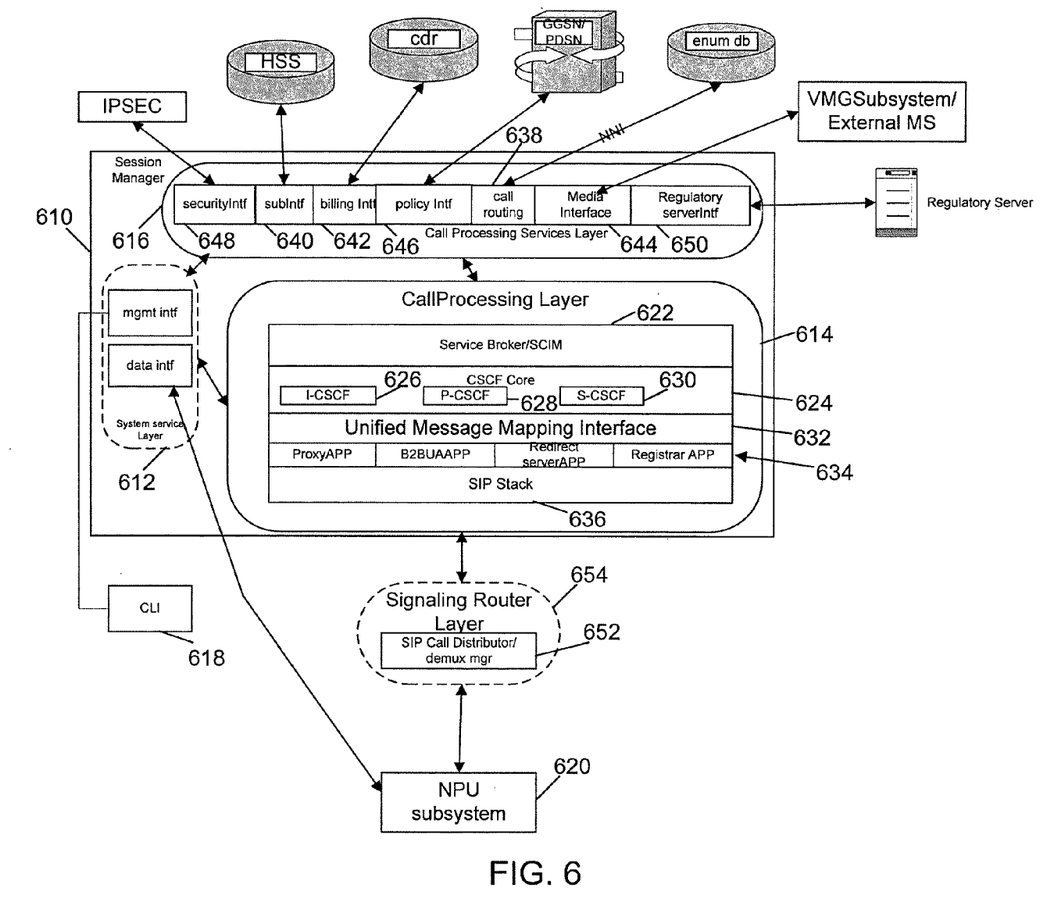
FIG. 6 is a control plane architecture for an IMS/MMD solution in accordance with certain embodiments.

FIG. 6 illustrates logical functions implemented on a chassis for a control plane architecture IMS/MMD solution in accordance with certain embodiments. A session manager 610 services and processes user session data flow for mobile nodes. Session manager 610 includes functional layers such as a system service layer 612, a call processing layer 614 and a call processing support services layer 616. The system services layer 612 provides an interface for instructions to be passed to the session manager and the other layers. A command line interface (CLI) 618 as well as network processing unit 620 interface are included. The call processing layer 614 includes a service broker/Service Control Interaction Manager (SCIM) 622, a CSCF core 624 that includes an I-CSCF 626, P-CSCF 628, and S-CSCF 630, a unified message mapping interface 632, applications 634, and a SIP stack 636. In some embodiments, the CSCF core includes one of the CSCF functionalities, for example, the P-CSCF. The call processing support services layer 616 includes a variety of services such as routing and address translation service 638, subscriber management service 640, changing interface service 642, media interface service 644, QoS policy interface service 646, security interface 648, and regulatory server interface 650.

Looking at the call processing layer 614, this layer includes signaling protocols and call control using universal SIP as an application program interface (API). The signaling protocols can be SIP or can be other protocols like ISUP, MGCP, or H.323. Further, the call processing layer 614 allows interworking between SIP variants and other protocols through a unified mapping interface. The unified mapping interface can convert protocol specific messages and parameters to a universal SIP like API format. SIP like messaging is used, in some embodiments, because SIP has the largest message set and can cover the possible messaging scenarios for SIP and the other protocols. The call processing layer 314 can also provide transparency to data that need not be processed by the CSCF core by placing that information into an envelope. Parameters that are not of interest can be placed in an envelope and remain unmodified. The CSCF core allows any text string as the calling and called number, the number does not need to be restricted to an E.164 number. The number could be, for example, an Address of Record (AoR) or any name string with a domain name.

A demux manager 652 resides in the signal routing layer 654, as shown in FIG. 6. The signal routing later 654 with the demux manager can determine where a traffic flow is sent for processing. The traffic flow can be sent to a process instance for further processing and/or signal handling.

The S-CSCF handles registration and call handling, among other things. In registration handling, the S-CSCF validates the RES received after the first time registration before sending a positive response. This response may be converted into 200OK in unified messaging mapping (UMM). The S-CSCF may also check the configured value of how many public user identities are allowed to be registered for that private entity. If the new registration is exceeding the limit, it can return a 403 response.

If it is the first time registration, the S-CSCF sends a request to HSS to get an authorization vector for the subscriber. The authorization vector includes certain parameters, which may be stored by the S-CSCF, while a response 401 is returned. In some embodiments, integrity protection is provided. If the REGISTER is received without integrity protection the message may be re-authenticated.

When the registration is complete, the S-CSCF may store the subscriber data in a local cache and also send a message to the signal routing layer to store the subscriber data. The contact information for a non barred public user id may be stored. It can add the list of received path headers and P-Associated URI with a list of public user identities to the 200OK before returning the result to the callLeg. A callLeg is one direction of a traffic flow in some embodiments.

The reduced call session setup techniques, such as a priority queue, and logical functions described above can implemented in a chassis in some embodiments. This chassis can implement multiple and different integrated functionalities. In some embodiments, an access gateway, a packet data serving node (PDSN), a foreign agent (FA), or a home agent (HA) can be implemented on a chassis. Other types of functionalities can also be implemented on a chassis in other embodiments are a Gateway General packet radio service Serving Node (GGSN), a serving GPRS support node (SGSN), a packet data inter-working function (PDIF), an access service network gateway (ASNGW), a base station, a access network, a User Plane Entity (UPE), an IP Gateway, an access gateway, a session initiation protocol (SIP) server, a proxy-call session control function (P-CSCF), and an interrogating-call session control function (I-CSCF). In certain embodiments, one or more of the above-mentioned other types of functionalities are integrated together or provided by the same functionality. For example, an access network can be integrated with a PDSN. A chassis can include a PDSN, a FA, a HA, a GGSN, a PDIF, an ASNGW, a UPE, an IP Gateway, an access gateway, or any other applicable access interface device. In certain embodiments, a chassis is provided by Starent Networks, Corp. of Tewksbury, Mass. in a ST16 or a ST40 multimedia platform.

The features of a chassis that implements an enterprise access gateway, in accordance with some embodiments, are further described below. The chassis includes slots for loading application cards and line cards. A midplane can be used in the chassis to provide intra-chassis communications, power connections, and transport paths between the various installed cards. The midplane can include buses such as a switch fabric, a control bus, a system management bus, a redundancy bus, and a time division multiplex (TDM) bus. The switch fabric is an IP-based transport path for user data throughout the chassis implemented by establishing inter-card communications between application cards and line cards. The control bus interconnects the control and management processors within the chassis. The chassis management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The chassis supports at least two types of application cards: a switch processor card and a packet accelerator card. The switch processor card serves as a controller of the chassis and is responsible for such things as initializing the chassis and loading software configurations onto other cards in the chassis. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations.

The packet accelerator card performs packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the chassis provide input/output connectivity and can also provide redundancy connections as well.

The operating system software can be based on a Linux software kernel and run specific applications in the chassis such as monitoring tasks and providing protocol stacks. The software allows chassis resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a PDSN, ASNGW, PDIF, HA, GGSN, or IPSG).

The chassis' software can be divided into a series of tasks that perform specific functions. These tasks communicate with each other as needed to share control and data information throughout the chassis. A task is a software process that performs a specific function related to system control or session processing. Three types of tasks operate within the chassis in some embodiments: critical tasks, controller tasks, and manager tasks. The critical tasks control functions that relate to the chassis' ability to process calls such as chassis initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a chassis include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the chassis by monitoring the various software and hardware components of the chassis. Recovery control task subsystem is responsible for executing a recovery action for failures that occur in the chassis and receives recovery actions from the high availability task subsystem. Shared configuration task subsystem provides the chassis with an ability to set, retrieve, and receive notification of chassis configuration parameter changes and is responsible for storing configuration data for the applications running within the chassis. Resource management subsystem is responsible for assigning resources (e.g., processor and memory capabilities) to tasks and for monitoring the task's use of the resources.

Virtual private network (VPN) subsystem manages the administrative and operational aspects of VPN-related entities in the chassis, which include creating separate VPN contexts, starting IP services within a VPN context, managing IP pools and subscriber IP addresses, and distributing the IP flow information within a VPN context. In some embodiments, within the chassis, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards. The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In some embodiments, the software needed for implementing a process or a database includes a high level procedural or an object-orientated language such as C, C++, C#, Java, or Perl. The software may also be implemented in assembly language if desired. Packet processing implemented in a chassis can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

We claim:

1. A chassis that facilitates network connectivity comprising:
   a proxy-call session control function (P-CSCF) residing on the chassis, the P-CSCF including a first queue with at least one session initiation protocol (SIP) message and at least one non-call related message waiting for airlink availability, a second queue reserved for call session setup messages for emergency calls, and a third queue reserved for non-call related messages, wherein the call session setup messages in the second queue are placed on the airlink prior to the at least one SIP message and the at least one non-call related message in the first queue and wherein the non-call related messages in the third queue wait for airlink availability until the at least one SIP message in the first queue and the call session setup messages in the second queue are placed on the airlink; and
   wherein the P-CSCF is configured to:
      receive a session initiation protocol (SIP) call session setup request message for an emergency call;
      send a SIP Invite message to set up an emergency call with a public service answering point (PSAP);
      receive a call session setup message in response to the call session setup request message;
      place the call session setup message in the first queue for the airlink ahead of the at least one SIP message and the at least one non-call related message waiting in the first queue; and
      if the first queue is congested,
         place the call session setup message in the second queue for the airlink; and
         place the at least one non-call related message in the first queue into the third queue.

2. The chassis of claim 1, wherein the P-CSCF is further configured to send the SIP Invite message to an emergency-call session control function (E-CSCF) for further routing.

3. The chassis of claim 2, wherein the P-CSCF is further configured to:
   receive a call back setup message from the E-CSCF;

place the call back setup message in the first queue for the airlink ahead of the at least one SIP message in the first queue; and if the first queue is congested, place the call back setup message in the second queue for the airlink.

4. The chassis of claim 1, wherein the at least one SIP message in the first queue includes a presence update.

5. The chassis of claim 1, wherein the P-CSCF is further configured to check a call session request uniform resource identifier (URI) and to determine if the URI matches an emergency URI.

6. A call session setup method comprising:
receiving a session initiation protocol (SIP) call session setup request message for a priority call at a proxy-call session control function (P-CSCF), wherein the priority call has a priority that is higher than a priority for at least some other calls;
sending a SIP Invite message from the P-CSCF to complete the call session request;
receiving a call session setup message in response to the call session setup request message at the P-CSCF and checking the call session setup message;
determining whether the call session setup message receives priority over other SIP messages and at least one non-call related message residing in a first queue for airlink availability;
placing the call session setup message in the first queue for the airlink ahead of the other SIP messages and the at least one non-call related message residing in the first queue;
if the first queue is congested,
placing the call session setup message in a second queue for the airlink, wherein the second queue is reserved for call session setup messages for priority calls and the call session setup messages in the second queue are placed on the airlink prior to the other SIP messages and the at least one non-call related message in the first queue; and
placing the at least one non-call related message in the first queue into a third queue, wherein the third queue is reserved for non-call related messages and the non-call messages in the third queue wait until the other SIP messages in the first queue and the call session setup messages in the second queue are placed on the airlink.

7. The method of claim 6, further comprising checking whether the call session setup request message is for an emergency call session.

8. The method of claim 6, further comprising sending the SIP Invite message to an emergency-call session control function (E-CSCF) for routing to a public service answering point (PSAP).

9. The method of claim 6, wherein the other SIP messages include a presence update message.

10. The method of claim 6, further comprising:
receiving a call back setup message from a public service answering point (PSAP);
placing the call back setup message in the first queue for the airlink ahead of the other SIP messages residing in the first queue; and
if the first queue is congested, placing the call back setup message in the second queue for the airlink.

11. The method of claim 6, wherein the priority calls include real-time multimedia calls.

12. A chassis comprising:
a proxy-call session control function (P-CSCF) residing on the chassis, the P-CSCF including a first queue with at least one session initiation protocol (SIP) message and at least one non-call related message waiting for airlink availability, a second queue reserved for call session setup messages for priority calls, and a third queue reserved for non-call related messages, wherein the call session setup messages in the second queue are placed on the airlink prior to the at least one SIP message and the at least one non-call related message in the first queue and wherein the non-call related messages in the third queue wait for airlink availability until the at least one SIP message in the first queue and the call session setup message in the second queue are placed on the airlink; and
wherein the P-CSCF is configured to:
receive a session initiation protocol (SIP) call session setup request message for a priority call;
send an SIP Invite message to set up a priority call;
receive a call session set up message in response to the call session setup request message;
place the call session setup message in the first queue for the airlink ahead of the at least one SIP message and the at least one non-call related message waiting in the first queue; and
if the first queue is congested,
place the call session setup message in the second queue for the airlink; and
place the at least one non-call related message in the first queue into the third queue.

13. The chassis of claim 12, wherein the priority calls include real-time multimedia calls.

14. The chassis of claim 12, wherein the non-call related message includes a text message.

15. The chassis of claim 12, wherein the non-call related message includes a presence update.

* * * * *